US011270566B1

(12) United States Patent
Cerminara et al.

(10) Patent No.: US 11,270,566 B1
(45) Date of Patent: Mar. 8, 2022

(54) PUBLIC SAFETY OFFICIAL ACCESSORIES HAVING AN INFRARED THERMOMETER

(71) Applicant: BK Technologies, Inc., West Melbourne, FL (US)

(72) Inventors: Daniel Kyle Cerminara, West Melbourne, FL (US); Timothy Anthony Vitou, Indialantic, FL (US); Juan Jose Giol, Davie, FL (US); Edmund Amartei Laryea, Sunrise, FL (US); Lorenzo Cruger, Jr., Boynton Beach, FL (US)

(73) Assignee: BK Technologies, Inc., West Melbourne, FL (US)

( * ) Notice: Subject to any disclaimer, the term of this patent is extended or adjusted under 35 U.S.C. 154(b) by 0 days.

(21) Appl. No.: 17/307,799

(22) Filed: May 4, 2021

(51) Int. Cl.
| | |
|---|---|
| *G08B 21/04* | (2006.01) |
| *G08B 7/06* | (2006.01) |
| *H04N 7/18* | (2006.01) |
| *G01J 5/0875* | (2022.01) |
| *G01J 5/04* | (2006.01) |
| *G01J 5/00* | (2022.01) |
| *G08B 3/10* | (2006.01) |
| *G08B 5/36* | (2006.01) |

(52) U.S. Cl.
CPC ........ *G08B 21/0453* (2013.01); *G01J 5/0025* (2013.01); *G01J 5/04* (2013.01); *G01J 5/0875* (2013.01); *G08B 7/06* (2013.01); *H04N 7/18* (2013.01); *G08B 3/10* (2013.01); *G08B 5/36* (2013.01)

(58) Field of Classification Search
CPC ..... A61B 1/00; G08B 21/0453; H01L 31/101; H01L 31/1035
See application file for complete search history.

(56) References Cited

U.S. PATENT DOCUMENTS

| | | | |
|---|---|---|---|
| 2006/0082730 A1* | 4/2006 | Franks ............. | G08B 13/19645 352/95 |
| 2007/0222580 A1* | 9/2007 | Chapman ............... | G04G 21/02 340/539.1 |
| 2016/0190859 A1* | 6/2016 | Blum .................... | F41C 33/029 348/372 |
| 2020/0281532 A1* | 9/2020 | Davis .................. | A61B 5/7278 |
| 2021/0169422 A1* | 6/2021 | Mashaw ................ | A61B 5/002 |

* cited by examiner

*Primary Examiner* — Mirza F Alam
(74) *Attorney, Agent, or Firm* — Kirton McConkie; Brian Tucker (57) ABSTRACT

Public safety official accessories, such as remote speaker microphones and body cameras, can include an infrared thermometer for enabling public safety officials to detect whether individuals have fevers. Temperature readings obtained using the public safety official accessories can be output to a display of a radio or of the public safety official accessory. By integrating an infrared thermometer into a public safety official accessory, the public safety official can discreetly determine whether an individual has a fever.

22 Claims, 10 Drawing Sheets

PUBLIC SAFETY OFFICIAL ACCESSORIES HAVING AN INFRARED THERMOMETER

CROSS-REFERENCE TO RELATED APPLICATIONS

N/A

BACKGROUND

It is oftentimes necessary for public safety officials to know whether individuals are ill prior to approaching them or allowing them to enter public places. For example, with the COVID-19 pandemic, there is an increased need to determine whether individuals have a fever.

BRIEF SUMMARY

Embodiments of the present invention encompass remote speaker microphones, body cameras and other public safety official accessories that include an infrared thermometer for enabling public safety officials to detect whether individuals have fevers. Temperature readings obtained using the public safety official accessories can be output to a display of a radio or of the public safety official accessory. By integrating an infrared thermometer into a public safety official accessory, the public safety official can discreetly determine whether an individual has a fever.

In some embodiments, the present invention may be implemented as a radio system that includes a radio, a display and a public safety official accessory. The public safety official accessory can include an infrared thermometer that generates temperature readings and a processor that causes the temperature readings to be output to the display.

In some embodiments, the display may be integrated into the radio or into the public safety official accessory.

In some embodiments, the public safety official accessory may be a remote speaker microphone or a body camera.

In some embodiments, the processor may be configured to obtain an image of an individual and associate the image with a temperature reading for the individual.

In some embodiments, the radio system may include an actuator for activating the infrared thermometer. In some embodiments, the actuator may be integrated into the public safety official accessory, the radio or an actuator device.

In some embodiments, the present invention may be implemented as a public safety official accessory that includes a housing that is configured to be worn by a public safety official. The housing may include a forward facing window. The public safety official accessory may also include an infrared thermometer positioned inside the housing. The infrared thermometer may be configured to generate temperature readings from infrared light received through the window. The public safety official accessory may further include a processor that causes the temperature readings to be output to a display.

In some embodiments, the display may be integrated into the housing of the public safety official accessory or may be integrated into a housing of a radio to which the public safety official accessory is connected.

In some embodiments, the public safety official accessory may include one or both of a speaker by which notifications of the temperature readings are output, or one or more visual output devices by which notifications of the temperature readings are output.

In some embodiments, the public safety official accessory may include a microphone or a camera.

In some embodiments, the present invention may be implemented as a radio system that includes a radio having a first display and a public safety official accessory that is connected to the radio. The public safety official accessory may include: a housing that is configured to be worn by a public safety official, the housing including a window; an infrared thermometer positioned inside the housing, the infrared thermometer being configured to generate temperature readings from infrared light received through the window; and a processor that causes the temperature readings to be output to the first display.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "public safety official accessory" will be used to represent an accessory that may be worn by a public safety official or other individual such as, but not limited to, a remote speaker microphone or a body camera. A public safety official or other individual would typically wear a public safety official accessory on the front of his or her body so that it faces forward. The term "radio system" will be used to represent a system that includes a radio and a public safety official accessory that is connected to the radio.

Figure 1:
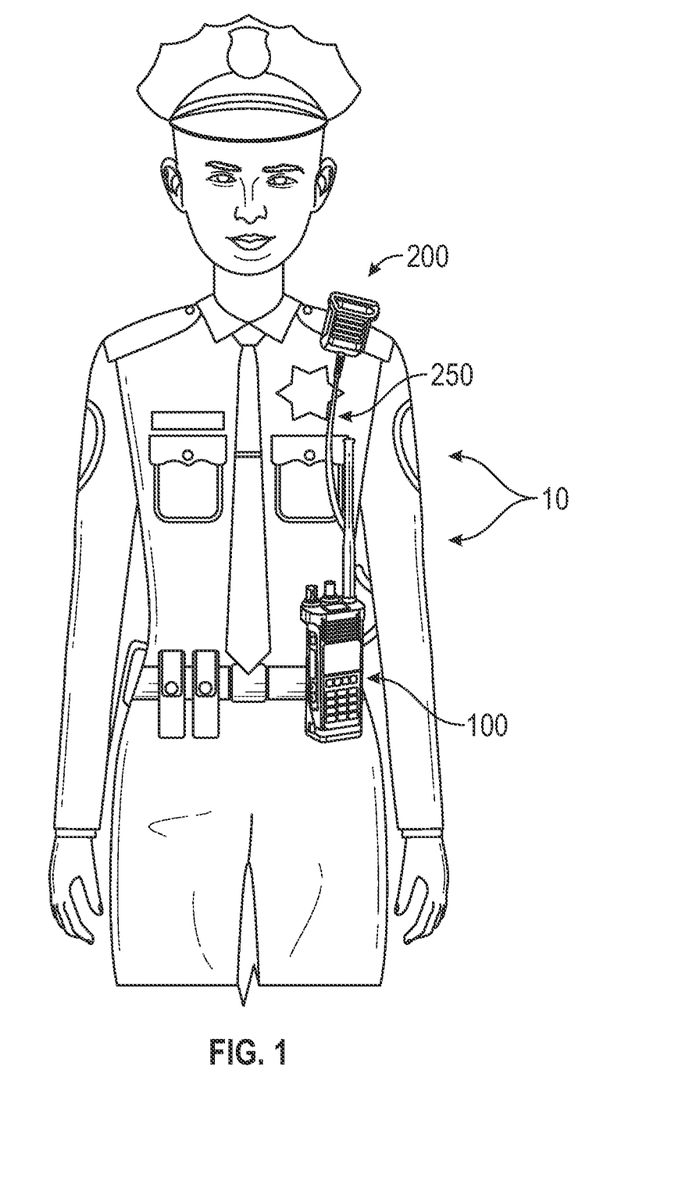
FIG. 1 provides an example of a radio system that is configured in accordance with one or more embodiments of the present invention.

FIG. 1 provides an example of a radio system 10 that is configured in accordance with one or more embodiments of the present invention. Radio system 10 includes a radio 100 and a remote speaker microphone 200 that is connected to radio 100 via a cable 250. However, in some embodiments, remote speaker microphone 200 could be connected to radio 100 via a wireless connection. As shown, a public safety official may oftentimes wear radio 100 on his or her belt while wearing remote speaker microphone 200 on his or her shoulder or another location where it faces forward.

Figure 2A:
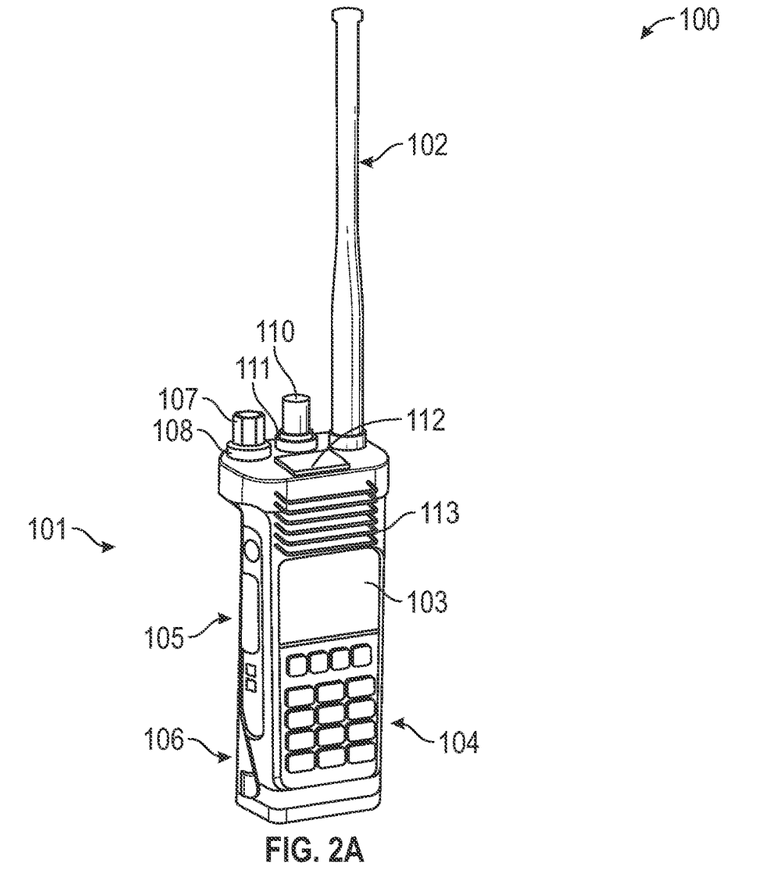
FIGS. 2A and 2B are front perspective and top views respectively of a radio that is configured in accordance with one or more embodiments of the present invention.
Figure 2B:
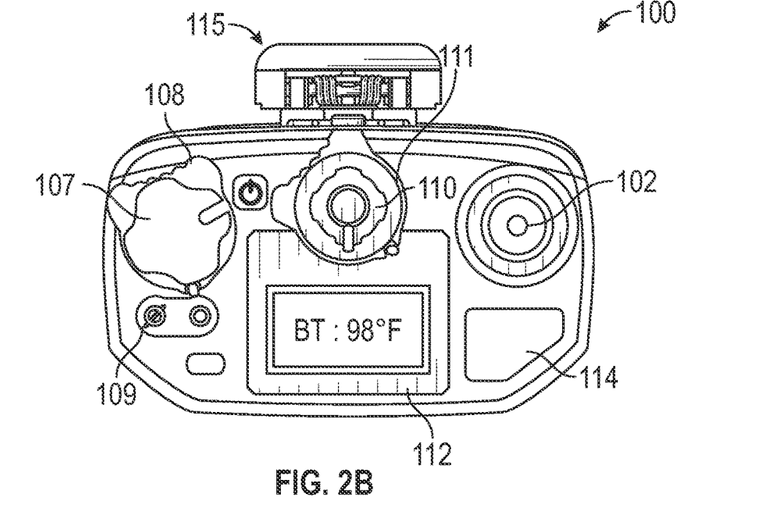

FIGS. 2A and 2B are front perspective and top views respectively of an example configuration of radio 100. In this example configuration, radio 100 includes a housing 101, an antenna 102, a front display 103, keys 104, push-to-talk buttons 105, a battery 106, a power/volume knob 107, an encryption knob 108, an encryption indictor 109, a channel selector 110, a zone selector 111, a top display 112, a speaker 113, a microphone (not shown), an emergency button 114, a clip 115 for attaching radio 100 (e.g., to a belt) and one or more communication ports (not shown) for connecting remote speaker microphone 200 to radio 100 via cable 250. In accordance with embodiments of the present invention, top display 112 and/or front display 103 may be employed to present a temperature reading to the public safety official.

Figure 3A:
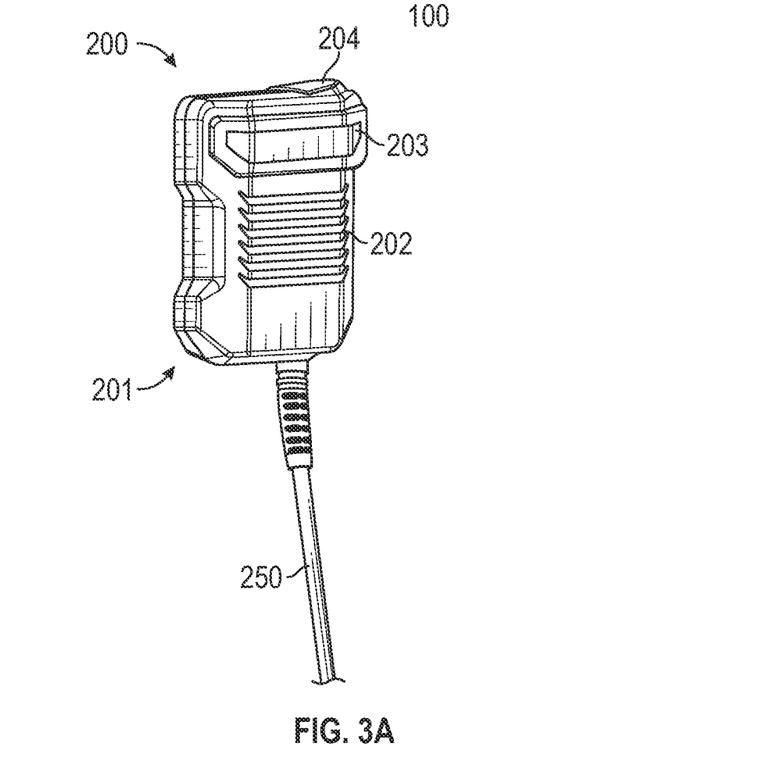
FIGS. 3A and 3B are front perspective and top views respectively of a remote speaker microphone that is configured in accordance with one or more embodiments of the present invention.
Figure 3B:
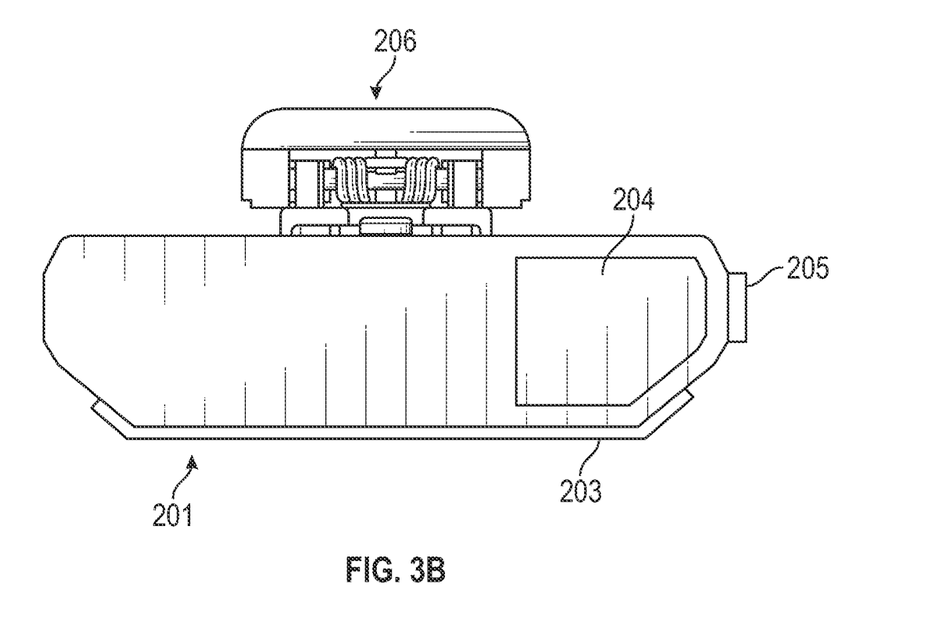

FIGS. 3A and 3B are front perspective and top views respectively of an example configuration of remote speaker microphone 200. In this example configuration, remote speaker microphone 200 includes a housing 201, a speaker 202, a microphone (not shown), a window 203 through which an infrared thermometer can obtain temperature readings, a push-to-talk button 204, an actuator 205 for activating the infrared thermometer and a clip 206 for attaching remote speaker microphone 200 to a public safety official's shirt, vest or other worn item. Actuator 205 may be a button, a switch, a user interface element, a voice input mechanism or any other suitable type of input mechanism. In some embodiments, actuator 205 may not be required as described below.

Figure 4A:
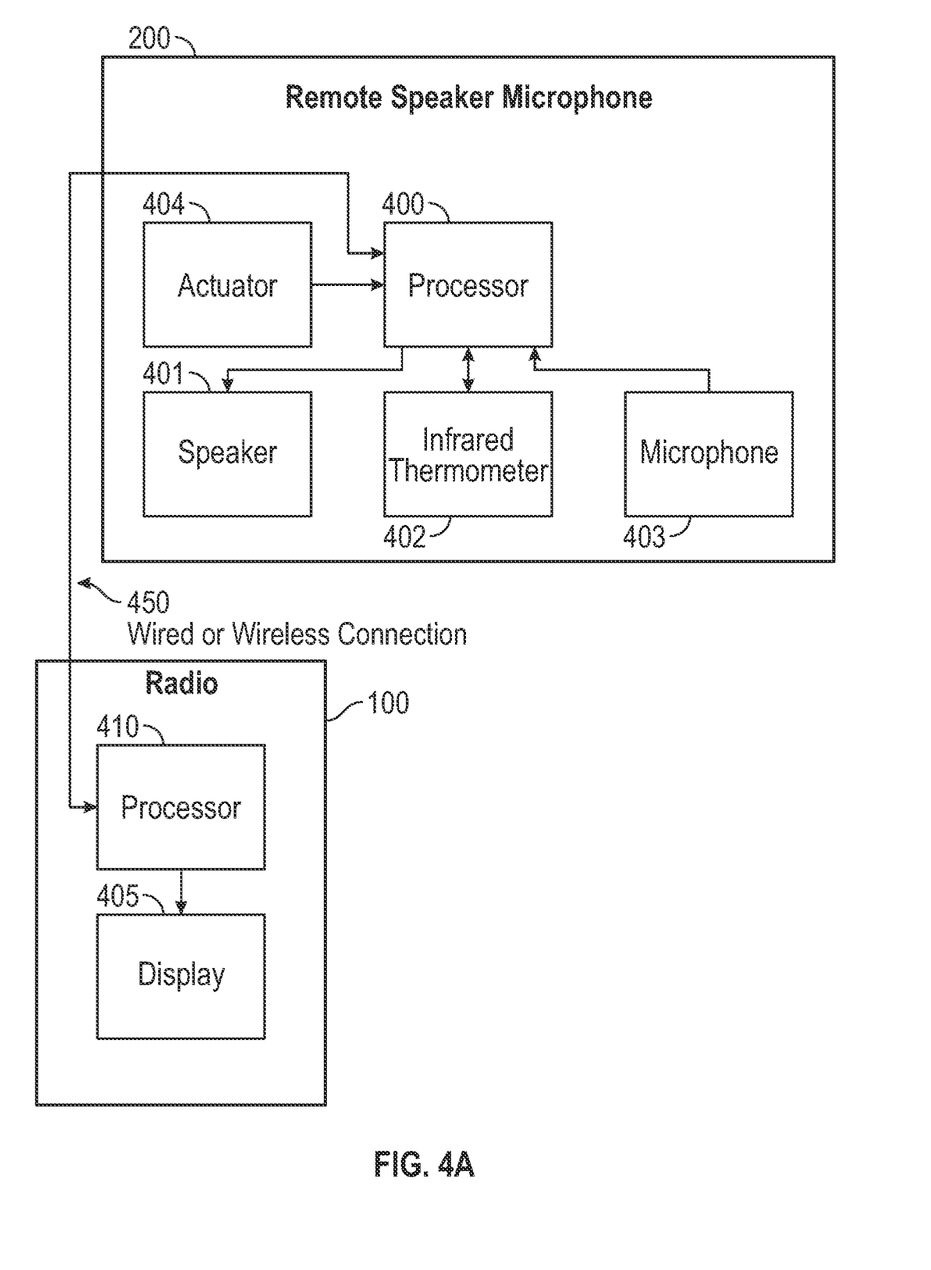
FIGS. 4A-4C are each block diagrams representing components that the radio system of FIG. 1 may include in one or more embodiments of the present invention.

FIG. 4A provides an example of internal circuitry, hardware or other components (hereinafter "components") that may be employed in a radio system, such as radio system 10, in one or more embodiments of the present invention. As shown, radio 100 may include a processor 410 and display 405, which could represent top display 112, among various other components. Remote speaker microphone 200 may include a processor 400, a speaker 401, which could represent speaker 202, an infrared thermometer 402, a microphone 403 and an actuator 404, which could represent actuator 205.

Processors 400 and 410 can be interconnected via a wired or wireless connection 450 such as via cable 250. Using connection 450, audio captured by microphone 403 can be sent to processor 410 for transmission over a radio frequency channel. Likewise, audio received by processor 410 over the radio frequency channel can be sent to processor 400 for output over speaker 401. Additionally, processor 400 can be configured to detect when a public safety official activates actuator 404 (e.g., by pressing a physical button, toggling a switch, selecting a user interface element on a touch screen, providing speech input, etc.), and, in response, can cause infrared thermometer 402 to capture a temperature reading. In some embodiments, rather than requiring manual activation to capture a temperature reading, processor 400 could leverage a motion sensor, facial detection sensor or other type of sensor to detect when an individual is approaching or nearby and, in response, could automatically capture a temperature reading of the approaching or nearby individual. Accordingly, processor 400 may interface with infrared thermometer 402 to reactively and/or proactively capture a temperate reading of an individual whom a public safety official is facing.

With reference to FIGS. 3A and 4A, infrared thermometer 402 can be positioned within housing 201 so that it can receive, through window 203, infrared light emitted by nearby or approaching individuals (e.g., from their foreheads). Infrared thermometer 402 can then generate a temperature reading based on the received infrared light. Processor 400 can receive such temperature readings and relay them to processor 410 which in turn can output the temperature readings to display 405. For example, by presenting the temperature readings on top display 112 of radio 100, the public safety official can quickly determine whether an individual has a fever by looking down at radio 100. Notably, because the public safety official will typically wear remote speaker microphone 200 on his or her shirt with window 203 facing forward, infrared thermometer 402 will likewise face forward towards any individual whom the public safety official is facing. As a result, the public safety official can determine the individual's body temperature discreetly. For example, the public safety official will not need to use his or her hands to point an infrared thermometer at the individual.

In some embodiments, processor 400 and/or processor 410 may be configured to evaluate a temperature reading for an individual to determine whether the individual has a fever. If so, processor 400 and/or processor 410 may generate and output a notification in addition to displaying the temperature reading. For example, an audible notification could be output via speaker 401 or a visual notification could be output via display 405 or via one or more LEDs or other visual output devices that remote speaker microphone 200 may include. By outputting such a notification, the public safety official can be immediately notified and warned that he or she should take caution or other appropriate action.

Figure 4B:
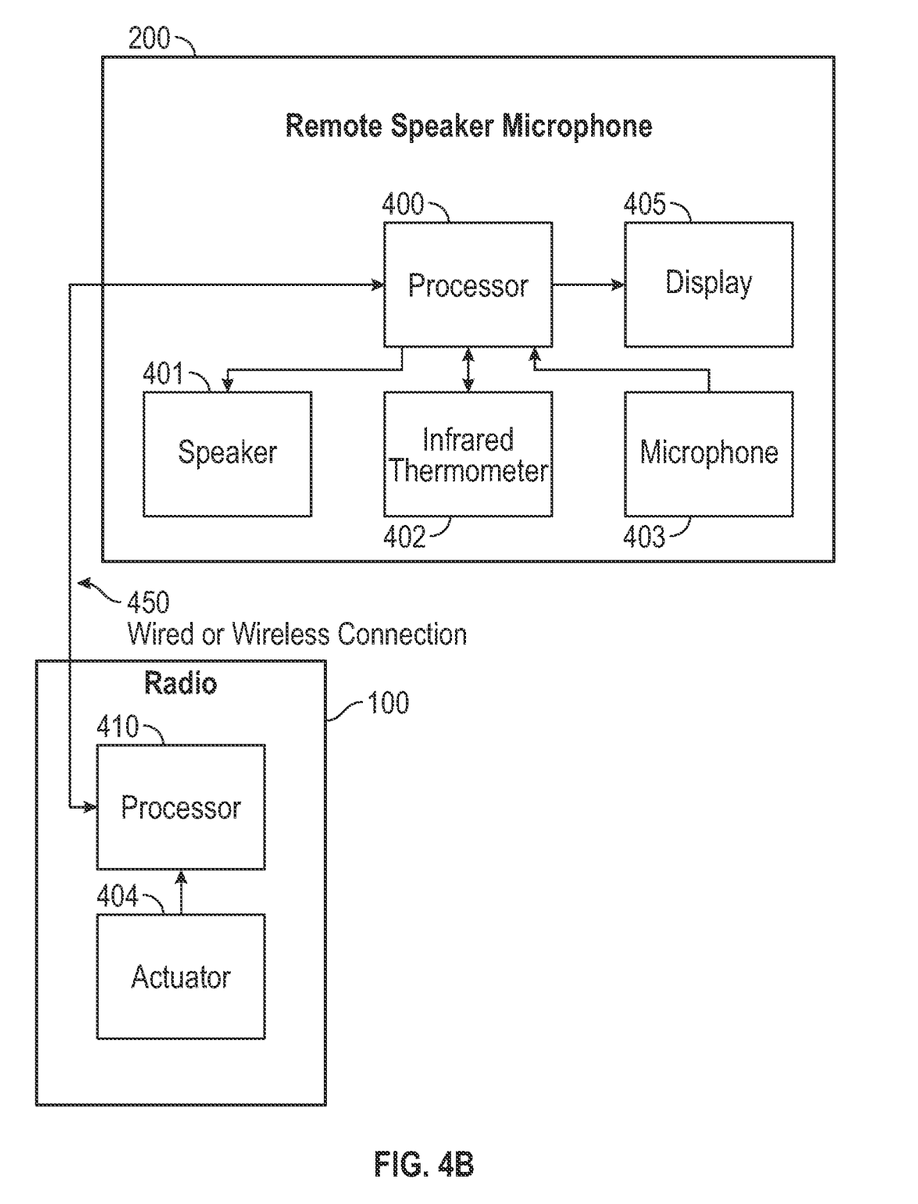

FIG. 4B provides another example of components that may be employed in radio system 10 in one or more embodiments of the present invention. In this example, display 405 is integrated into remote speaker microphone 200 while actuator 404 is integrated into radio 100. Accordingly, the public safety official could activate infrared thermometer 402 by interfacing with radio 100, and the temperature readings would be presented on remote speaker microphone 200. In other embodiments, both actuator 404 and display 405 could be integrated into radio 100 or into remote speaker microphone 200.

Figure 4C:
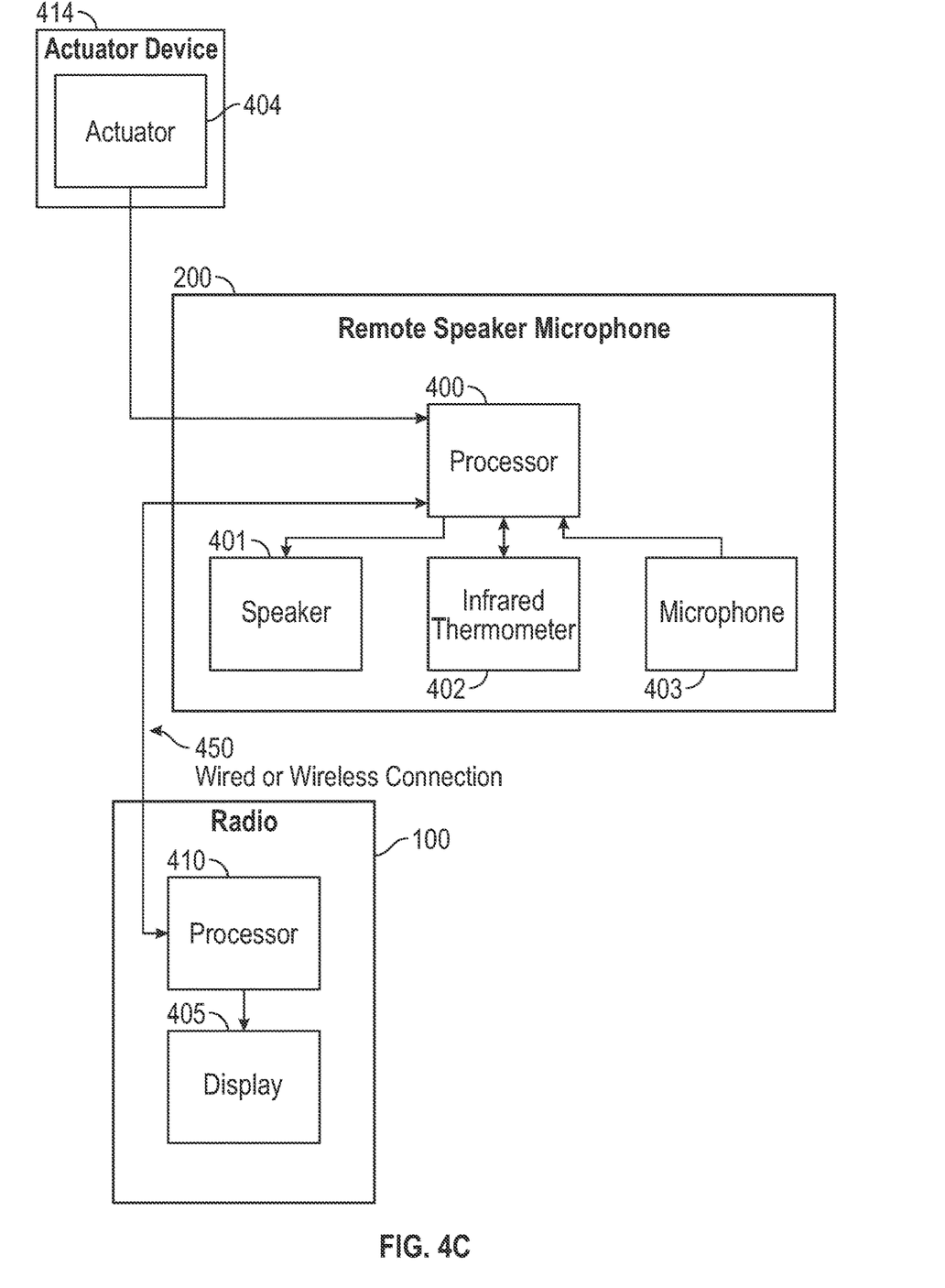

FIG. 4C provides another example of components that may be employed in radio system 10 in one or more embodiments of the present invention. In this example, actuator 404 is integrated into a dedicated actuator device 414 that may be connected to processor 400 via a wired or wireless connection.

In some embodiments, processor 410 may be configured to transmit temperature readings to a server or another computing device. For example, processor 410 could establish a wired or wireless connection with a server to transfer temperature readings to a server for storage or for viewing by a remote public safety official.

Figure 5A:
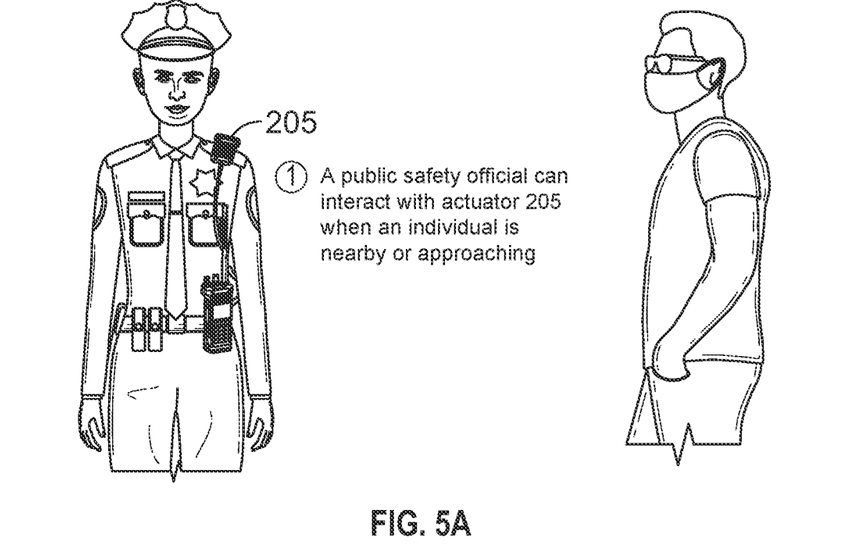
FIGS. 5A-5D provide an example of how a radio system may be used to detect that an approaching individual has a fever in accordance with one or more embodiments of the present invention.

FIGS. 5A-5D provide an example of how a public safety official may use radio system 10 to determine whether an individual has a fever. In FIG. 5A, it is assumed that an individual is approaching a public safety official who is wearing radio 100 and remote speaker microphone 200. Then, in step 1, the public safety official may interact (e.g., press) actuator 205 (whether positioned on remote speaker microphone 200, radio 100, actuator device 414 or some other device) to thereby activate infrared thermometer 402. In some embodiments, however, step 1 could entail processor 400 automatically activating infrared thermometer 402 in response to detecting that the individual is nearby or approaching. Also, in some embodiments, infrared thermometer 402 may already be activated or may always remain activated such that step 1 is unnecessary.

Figure 5B:
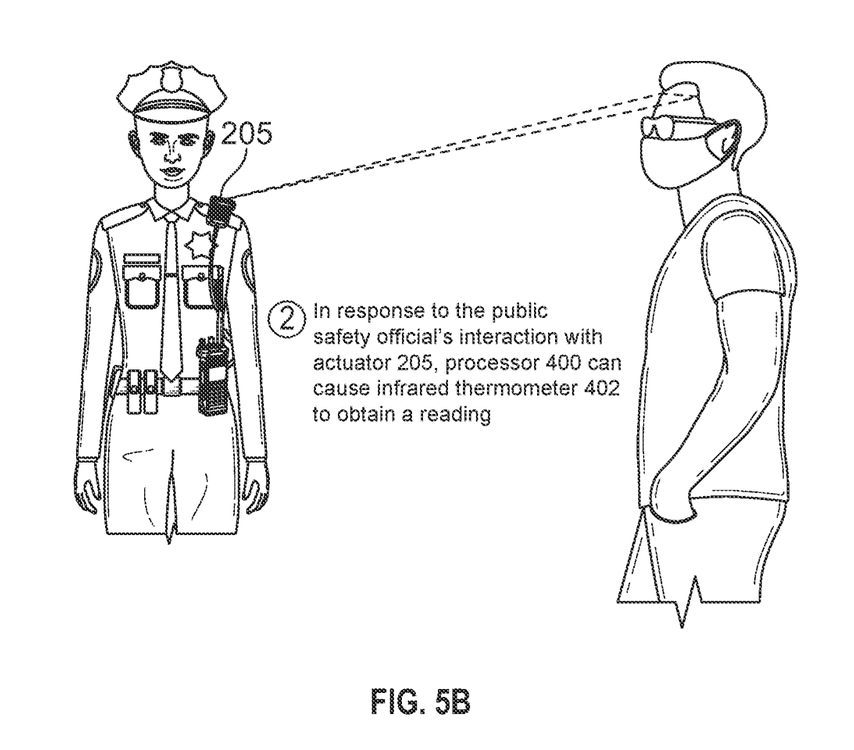

Turning to FIG. 5B, in step 2, which could be performed in response to the public safety official interacting with actuator 205, in response to processor 400 detecting the presence of an individual or in response to some other detection or input, processor 400 can cause infrared thermometer 402 to obtain a temperature reading. As represented by the dashed lines, infrared thermometer 402 can read the individual's temperature by capturing infrared light that is emitted from his or her forehead or other exposed skin. Because the public safety official is wearing remote speaker microphone 200, window 203 and infrared thermometer 402 can be oriented toward the individual while he or she is approaching or otherwise in front of the public safety official. Therefore, the infrared light emitted from the individual's forehead or other exposed skin may enter window 203 and be captured by infrared thermometer 402 without requiring the public safety official to otherwise point a thermometer at the individual.

In some embodiments, processor 400 may be configured to steer/orient infrared thermometer 402 within housing 201 so that it is oriented directly towards the individual's forehead. For example, remote speaker microphone 200 could include an infrared sensor that generates a heat map of any objects or environment in front of window 203. Using such a heat map, processor 400 could detect where an individual's forehead or other exposed skin is and adjust the orientation of infrared thermometer 402 within housing 201 to attempt to point infrared thermometer 402 directly at the individual's forehead. Alternatively, infrared thermometer 402 may be configured to steer itself in this manner.

Figure 5C:
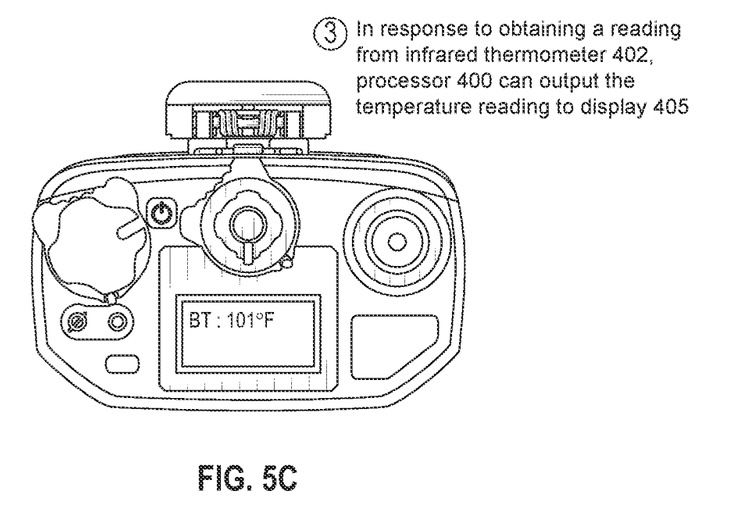

Turning to FIG. 5C, in step 3, when processor 400 obtains a temperature reading from infrared thermometer 402, processor 400 can cause a visual representation of the temperature reading to be displayed to the public safety official. As described above, processor 400 could do so by relaying the temperature reading to processor 410 which in turn could output the temperature reading on top display 112 as shown in FIG. 5C. Also or alternatively, processor 400 could output the temperature reading on any display that may be integrated into remote speaker microphone 200.

Figure 5D:
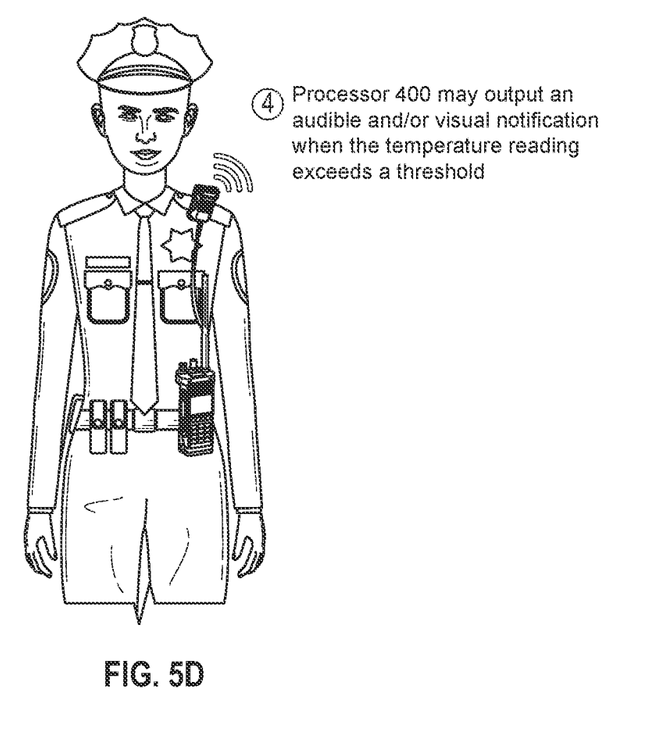

Turning to FIG. 5D, in step 4, processor 400 (or processor 410) may output an audible and/or visual notification when the temperature reading exceeds a threshold. For example, processor 400 (or processor 410) may determine if the temperature reading exceeds 100.4° F. and, if so, may output an audible and/or visual warning from remote speaker microphone 200 and/or radio 100.

Figure 6:
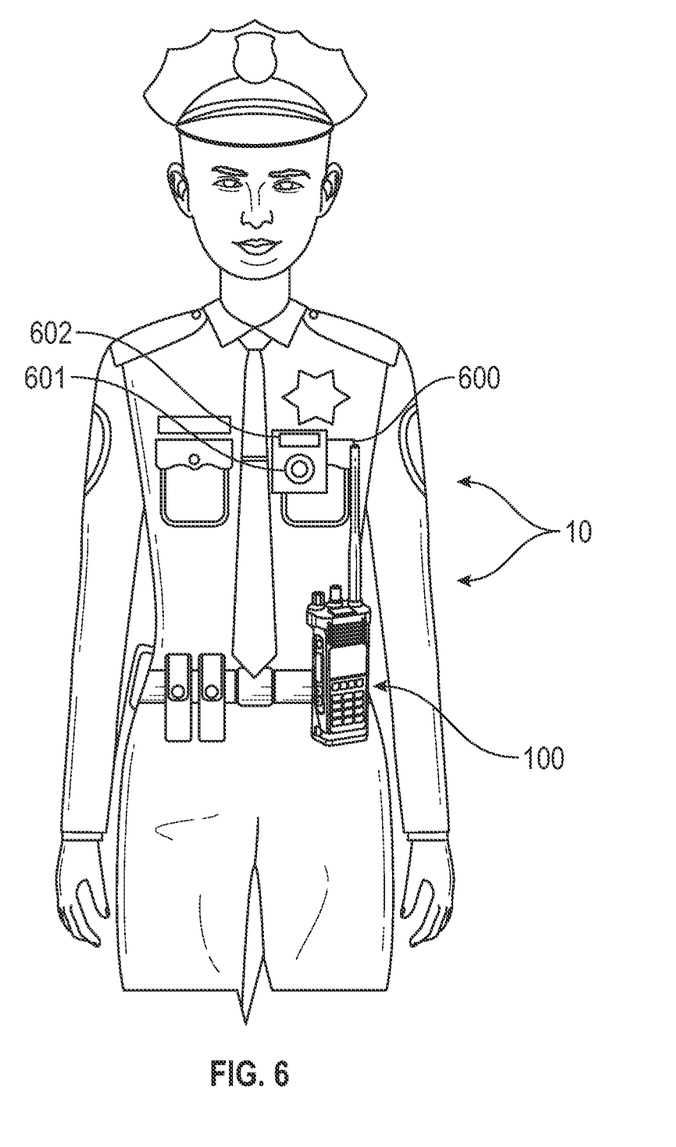
FIG. 6 provides another example of a radio system that is configured in accordance with one or more embodiments of the present invention.

FIG. 6 provides an example where radio system 10 includes a body camera 600 that includes a camera 601 and a window 602 through which infrared thermometer 402 can obtain temperature readings. Although not shown, body camera 600 may include an actuator similar to actuator 205 or a sensor for activating infrared thermometer 402.

Figure 7:
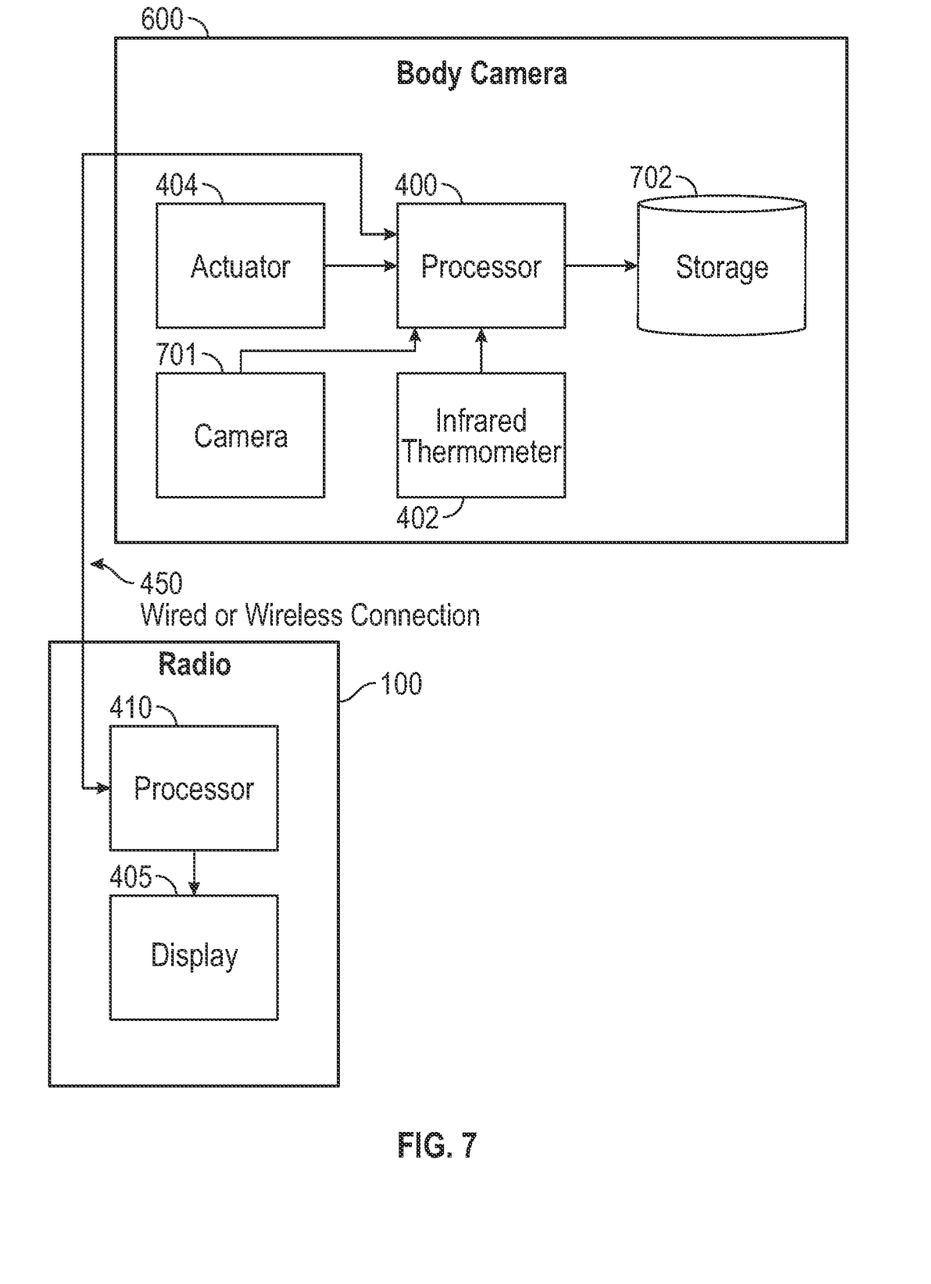
FIG. 7 is a block diagram representing components that the radio system of FIG. 6 may include in one or more embodiments of the present invention.

FIG. 7, like FIGS. 4A-4C, provides an example of components that may be employed in a radio system that includes body camera 600, such as radio system 10, in one or more embodiments of the present invention. In the depicted example, radio 100 includes processor 410 and display 405 as described above. Body camera 600 includes processor 400, infrared thermometer 402, actuator 404, camera 701 and storage 702. As described above, in some embodiments, actuator 404 could be integrated into radio 100 or actuator device 414. Also, in some embodiments, storage 702 could be maintained on radio 100 or a server or other computing device with which radio 100 may communicate.

Infrared thermometer 402 in body camera 600 can function as described above. Additionally, processor 400 may interface with camera 701 to capture an image of the individual whose temperature is being read and may store the image along with the temperature reading in storage 702. Alternatively or additionally, processor 400 may transmit the image and the temperature reading to processor 410 for storage on radio 100 or for transmission to a server or other computing device. In any case, camera 701 can be leveraged to create and store an association between a temperature reading and an image of the individual whose temperature was read. Such an association could be subsequently used to confirm the identity of an individual who was experiencing a fever or otherwise had a temperature reading meeting specified criteria.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A radio system comprising:
   a radio that is configured to be worn by a public safety official;
   a display; and
   a public safety official accessory that is also configured to be worn by the public safety official, the public safety official accessory having an infrared thermometer that generates temperature readings of an individual who the public safety official is facing while wearing the public safety official accessory and a processor that causes the temperature readings to be output to the display, wherein the display is either integrated into the radio or into the public safety official accessory to thereby enable the public safety official to view the temperature readings while wearing the radio and the public safety official accessory.

2. The radio system of claim 1, wherein the display is integrated into the radio.

3. The radio system of claim 1, wherein the display is integrated into the public safety official accessory.

4. The radio system of claim 1, wherein the public safety official accessory is a remote speaker microphone.

5. The radio system of claim 1, wherein the public safety official accessory is a body camera.

6. The radio system of claim 5, wherein the processor is configured to obtain an image of an individual and associate the image with a temperature reading for the individual.

7. The radio system of claim 1, further comprising:
   an actuator for activating the infrared thermometer.

8. The radio system of claim 7, wherein the actuator is integrated into the public safety official accessory.

9. The radio system of claim 7, wherein the actuator is integrated into the radio.

10. The radio system of claim 7, wherein the actuator is integrated into an actuator device.

11. A public safety official accessory comprising:
    a housing that is configured to be worn by a public safety official, the housing including a forward facing window;
    an infrared thermometer positioned inside the housing, the infrared thermometer being configured to generate temperature readings from infrared light received through the window when the public safety official is facing an individual while the public safety official is wearing the public safety official accessory; and a processor that causes the temperature readings to be output to a display, wherein the display is either integrated into the housing of the public safety official accessory or integrated into a housing of a radio to which the public safety official accessory is connected and which is configured to be worn by the public safety official to thereby enable the public safety official to view the temperature readings while wearing the radio and the public safety official accessory.

12. The public safety official accessory of claim 11, wherein the display is integrated mw the integrated into the housing of the radio to which the public safety official accessory is connected.

13. The public safety official accessory of claim 11, further comprising:
one or both of:
a speaker by which notifications of the temperature readings are output; or
one or more visual output devices by which notifications of the temperature readings are output.

14. The public safety official accessory of claim 11, further comprising:
a microphone.

15. The public safety official accessory of claim 11, further comprising:
a camera.

16. A radio system comprising:
a radio having a first display, the radio being configured to be worn by a public safety official;
a public safety official accessory that is connected to the radio, the public safety official accessory comprising:
a housing that is configured to be worn by a public safety official, the housing including a window;
an infrared thermometer positioned inside the housing, the infrared thermometer being configured to generate temperature readings from infrared light received through the window when the public safety official is facing an individual while the public safety official is wearing the public safety official accessory; and
a processor that causes the temperature readings to be output to the first display to thereby enable the public safety official to view the temperature readings while wearing the radio and the public safety official accessory.

17. The radio system of claim 16, wherein the public safety official accessory includes a microphone for capturing audio that is relayed to the radio for transmission.

18. The radio system of claim 16, wherein the public safety official accessory includes a speaker for outputting audio that is received by the radio.

19. The radio system of claim 16, wherein the public safety official accessory includes a camera for capturing images of individuals for whom the temperature readings are generated.

20. The radio system of claim 16, further comprising:
one or more actuators for activating the infrared thermometer to thereby cause one or more temperature readings to be output to the first display.

21. The radio system of claim 1, wherein the processor is configured to transmit the temperature readings to a server or another computing device.

22. The radio system of claim 6, wherein the processor is configured to transmit the image of the individual and the temperature reading for the individual to a server or another computing device.

* * * * *